Sept. 14, 1937.                H. R. TEAR                 2,093,386
                          LUBRICATING DEVICE
                         Filed June 11, 1934          2 Sheets-Sheet 1
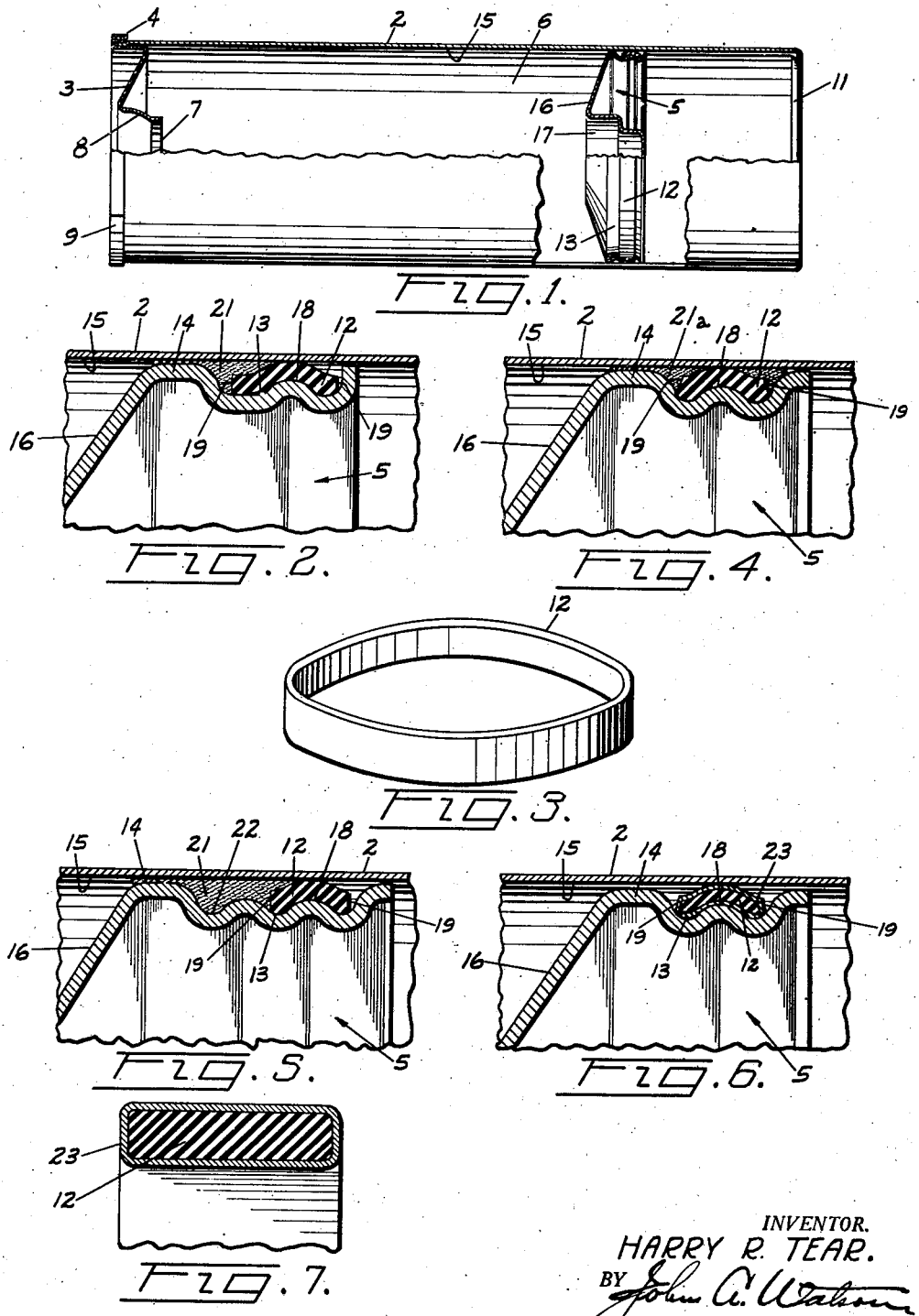
INVENTOR.
HARRY R. TEAR.
BY
ATTORNEY Sept. 14, 1937.     H. R. TEAR     2,093,386
LUBRICATING DEVICE
Filed June 11, 1934     2 Sheets-Sheet 2

INVENTOR.
HARRY R. TEAR
BY
ATTORNEY

Patented Sept. 14, 1937

2,093,386

UNITED STATES PATENT OFFICE 2,093,386

LUBRICATING DEVICE

Harry R. Tear, Evanston, Ill., assignor to The Lubrication Corporation, Chicago, Ill., a corporation of Delaware Application June 11, 1934, Serial No. 730,016

11 Claims. (Cl. 221—47.3)

This invention relates to improvements in lubricating devices and more particularly to pistons and piston packing for lubricant containers and cartridges wherein a piston comprises one of the lubricant confining walls of the container or cartridge.

In the distribution and use of lubricant, in interchangeable cartridges, for lubricant guns, or other lubricant dispensing apparatus, it is desirable that the cartridge be constructed of cylindrical form and be provided with a piston, comprising one of the confining walls of the cartridge lubricant containing space, so that the piston may move along the inner walls of the cylindrical container or cartridge either under atmospheric pressure or under force applied to the rearward face of the piston, thereby to assure of the discharge of all of the lubricant contents from the cartridge. Such a piston, in order to operate properly, must have lubricant-tight sealing engagement with the inner cartridge walls so that air may not be admitted into the lubricant confining space, and conversely to preclude the leakage of lubricant past the piston particularly in such cases as where the piston is urged inwardly of the cartridge under pressures greater than atmospheric pressure.

An object of my invention is to provide a lubricant container, or cartridge, of the character described incorporating a novel cartridge piston packing means having relatively high resiliency thereby readily to conform to the inner walls of the cartridge regardless of slight irregularities of wall surface such as caused by the presence of overlapping or lock-seams or as a result of variations in internal cartridge wall diameters.

Another object is to provide a cartridge of the character described including a piston having a packing ring of material, such as rubber, normally subject to damage by contact with ordinary greases or lubricants, wherein novel means are employed to protect the packing from direct contact with the grease or lubricant contents of the cartridge.

A further object is to provide a cartridge piston having a packing so constructed as to provide increased sealing function during the normal advance movement of the piston along the axis of the cartridge, as during the discharge of the contents thereof.

Other objects, the advantages, and uses of the invention will be, or should become, apparent after reading the following specification and claims and after consideration of the drawings forming a part of the specification, wherein Fig. 1 is a partial sectional view of a lubricant cartridge constructed in accordance with the invention;

Fig. 2 is a fragmentary sectional view of a part of the cartridge of Fig. 1;

Fig. 3 is a perspective view of the packing ring of the cartridge piston;

Figure 8:
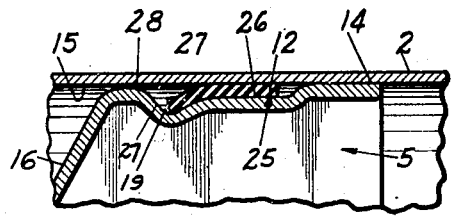

Figs. 4 to 6 inclusive are views, similar to Fig. 2, illustrating other forms of the piston and piston packing;

Fig. 7 is an enlarged sectional view of the piston packing of Fig. 6; and

Figs. 8 to 15 inclusive are views, similar to Fig. 2, each illustrating another form of the piston and piston packing structure.

In Fig. 1 I have illustrated a typical form of interchangeable lubricant cartridge such as for use with hand lubricant guns which comprises, a hollow sheet metal cylinder 2 having an end closure at its forward end formed of a stamping 3 secured to the cylinder as by a folded seam 4, a sheet metal piston 5 slidably mounted within the cylinder 2 and forming a rear closure for the cylinder thereby to provide a lubricant confining space 6 between the closure 3 and piston 5. An outlet opening 7 may be formed centrally of the enclosure 3, the walls 8 of which may be fashioned to provide sealing engagement with the cartridge connector stud of a lubricant gun or other lubricant feeding device with which the cartridge is to be used. In the cartridge illustrated, the wall 8 is concave and spherical. Bayonet lugs 9 may be formed in the seam 4 to serve as an attaching means for providing quick attachment and detachment of the cartridge to and from the aforesaid gun or dispensing device. Subsequent to the installation of the piston 5 within the cylindrical body of the cartridge, a bead 11 may be formed on the rearward end of the cylinder 2 thereby to retain the piston within the cartridge during shipment, to stiffen the body and to avoid exposing the sharp edge, which would be objectionable in handling the cartridge.

My invention relates particularly to the piston and piston packing means and contemplates the provision of a pliant packing ring 12, preferably of soft rubber, located in an annular depression 13 formed in the outer side wall 14 of the piston 5, and of such thickness that at least a portion of the packing extends beyond the outermost region of the piston side wall to engage with the inner side wall 15 of the cylindrical cartridge body 2.

The piston 5, selected for illustration herein, may be formed of sheet metal of sufficient rigidity to maintain its preformed contour under substantially heavy thrusts applied thereto of a purely mechanical or fluid nature. The head 16 of the piston may be provided with a central depression 17 in its outer face adapted to embrace that portion of the end closure 3 forming the outlet wall 8 thereby to assure of the complete discharge of lubricant from within the cartridge as the piston is moved or urged inwardly thereof.

I prefer to employ a rubber band, or packing ring, 12 of a diameter less than the diameter of the side wall 14 of the piston thereby to cause the packing ring closely to adhere to the wall of the annular depression 13 when in place thereupon. The central portion of that region of the outer wall of the piston forming the depression 13 is preferably curved outwardly, as shown at 18, thereby to cause the packing ring 12, at its mid-point, to extend beyond the side wall 14 of the piston and into close engagement with the inner side wall 15 of the cartridge body, the edges 19 of the packing ring being free of engagement with the cartridge wall. This arrangement of the packing ring provides a relatively broad surface of contact between the packing ring and piston wall 14 by virtue of the elastic properties of the packing ring and a substantial zone of contact between the packing ring and cartridge side wall, the extent of which is enhanced rather than diminished as the piston is moved relative to the cylinder. This latter function of the packing is one of importance and is attributed largely to the high ductility of the packing ring and its susceptibility to lateral compression closely to fill the space between the piston and cartridge side wall.

Inasmuch as soft rubber will deteriorate when brought into contact with most petroleum oils, and practically all lubricants and greases employed for the servicing of lubricant-receiving bearings contain petroleum oils, I have devised simple and efficient protective means for precluding direct contact between the lubricant contents of the cartridge and the packing ring 12 and at the same time to provide special lubrication, for the packing, of a beneficial nature. To this end, a deposit of a preparation of petroleum oil-impervious material 21 is disposed between the packing ring 12 and the inner end, or head, 16 of the piston between the side walls 14 and 15 of the piston and cartridge respectively and also on the surface of the packing ring 12. Within this class of preparations I have found that a gel of soda-rosin and soda-hydrofol soaps in glycerine known to the trade as "Plug Valve Lubricant No. 3" and sold by the "Standard Oil Company (Indiana)" may be used satisfactorily. This gel has the property of providing adequate lubrication to the surface of the packing ring to permit it to slide readily along the cartridge wall and its consistency is sufficient to render disposition in the manner described, both practical and lasting. Other preparations or gels of an oil-impervious nature may be substituted for the gel described, including mixtures or gels consisting of soaps in polyhydroxyl alcohols. Needless to say, the preparation should be of a substantially neutral nature in order not to cause corrosion of the metal surfaces of the piston or cartridge walls.

In Fig. 4 I have illustrated a modified form of the piston packing of Fig. 2 wherein the deposited preparation 21a is disclosed as located upon both sides of the packing ring 12 thereby to surround, in substantial amounts, all portions of the packing ring 12 not in direct contact with metal. In practice, I have found it best to apply substantial amounts of the preparation to the packing prior to the introduction of the piston into the cartridge, and if desired the packing ring may be wiped with the preparation prior to disposition upon the piston, or a film of the preparation may be placed within the depression 13 prior to disposition of the packing ring therein followed by a deposit of the preparation upon the assembled piston in the manner described.

In Fig. 5 I have illustrated another form of the piston and packing which differs from that illustrated in Fig. 2 in the provision of a second annular depression 22 in the piston side wall 14 forwardly of the depression 13, thereby to increase the space within which the deposit 21 may be disposed thus to assure an ample quantity of the protective substance forwardly of the piston packing ring.

In Fig. 6, I have illustrated another form of the piston packing which differs from that illustrated in Fig. 2 only by the elimination of the protective preparation 21 and the substitution therefor of a coating of oil-impervious flexible substance such as collodion, flexible varnish, and glue-glycerine preparations over the entire packing ring 12 as illustrated at 23. This coating, see Fig. 7, may be applied to the packing ring as by dipping the ring into a bath of the protective substance and in applying the ring to the piston after the coating has set or attained a consistency to permit of its being handled.

The pistons thus far described all possess the advantageous characteristics attributed thereto by the provision of a relatively soft packing ring, the central portion of which is urged outwardly under compression into intimate contact with the inner cartridge wall, and the edges of which lie within the depression in the outer piston wall and within a diameter less than the outside diameter of the piston wall 14, thus to facilitate the entry of the piston into the cartridge as during assembly. Each of the pistons described includes, in addition, protective deposits or coatings of petroleum oil-impervious and oil-insoluble substances, thereby separating the rubber packing from the oily lubricant contents of the cartridge to the end that a long useful life of the piston packing is assured.

In Figs. 8 to 13 inclusive I have illustrated other forms of the piston and packing structure all of which include the pliant rubber packing ring 12 of Fig. 3 and which differ from one another and from the structures heretofore described in the arrangement of the packing ring by variation in contour and location of the packing-receiving depression in the piston side wall 14. The protective deposit 21 or the protective coating 23 may be employed as desired and in the manner described for precluding deterioration of the packing ring.

The piston of Fig. 8 has an annular depression 25 located adjacent the inner end or head 16 of the piston including a portion 26 providing a cylindrical packing-receiving surface parallel to the inner wall 15 of the cartridge body and lying inwardly from the piston side wall 14 a distance less than the normal thickness of the packing ring 12. The forward portion 27 of the depression is defined by an inwardly curved surface of greater depth than the normal thickness of the packing ring. This arrangement of the depression and packing ring, as in the piston of Figs. 1 to 6 inclusive, results in maintaining a relatively low frictional condition between packing ring and cartridge wall without sacrifice of sealing properties and at the same time facilitates entry of the piston into the cartridge during assembly by virtue of the decreased diameter of that portion of the ring 12 in the portion 27 of the depression at the leading edge of the piston.

It is important in pistons of the type disclosed herein that the packing ring be wider than it is thick so that it cannot turn or "roll-up" as the piston moves. It is also desirable to limit the compressed portion of the packing so as to reduce radial thrust and hence reduce frictional resistance to longitudinal movement of the piston. These features are provided by all of the pistons disclosed and in addition, as pointed out, each of the packing rings in the several forms illustrated fall away from the wall of the cartridge at one or both edges, thus to facilitate entry of the piston into the cartridge. This latter advantage is attributable to the formation and disposition of the annular depression in the outer piston wall.

Figure 9:
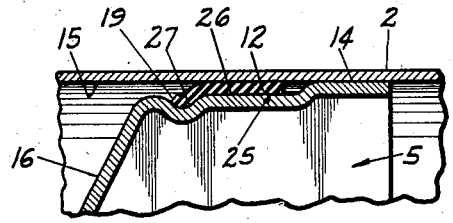

The piston and packing of Fig. 9 is identical to that illustrated in Fig. 8 except that the forward portion 27 of the packing receiving depression terminates at the inner end or head 16 of the piston whereas in the piston of Fig. 8 the piston side wall 14 ahead of the depression, as shown at 28, remains intact and may serve as an additional guide surface to prevent piston canting.

Figure 10:
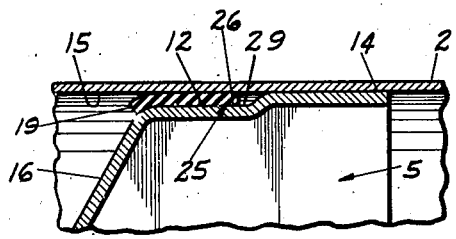

In Fig. 10 the depression 29, within which the packing ring 12 is but partially received, comprises a portion of reduced diameter of the piston side wall 14 presenting a cylindrical surface upon which the major portion of the packing ring may rest.

Figure 11:
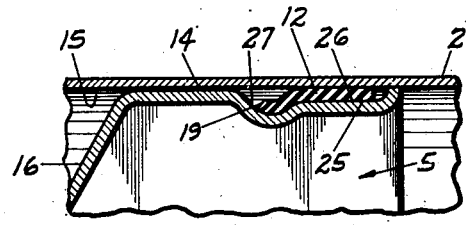

The piston of Fig. 11 is similar in structure to the piston of Fig. 8 except that the depression 25 is located adjacent to the rearward end of the piston.

Each of the pistons of Figs. 8 to 11 inclusive is intended for introduction into the cylindrical body 2 of the cartridge, subsequent to assembly of the packing ring 12 thereupon, through the rearward end of the cartridge body prior to the formation of the bead 11. Continued forward or inward movement of the pistons in each of the forms mentioned will augment the piston sealing characteristics of the packing rings 12 due to the ability of the rubber of the ring to virtually "flow" under lateral compression thereby to closely contact the adjacent and spaced apart walls of the cartridge body and packing receiving depression.

Figure 12:
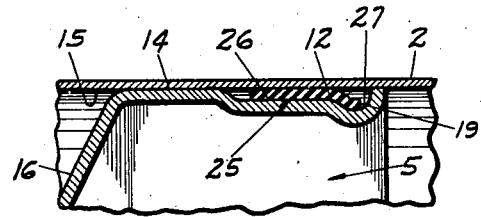
Figure 13:
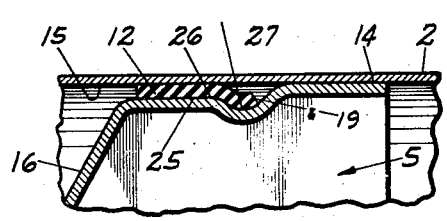

In Figs. 12 and 13 I have shown piston and packing assemblies which are intended to be introduced through the forward end of the cartridge body 2, as prior to securing the end closure 3 thereto.

The piston of Fig. 12 is similar to the piston of Fig. 11 except that the inwardly curved portion 27, or portion of increased depth, of the depression 25 is located at the posterior side of the depression and adjacent to the rearward end of the piston side wall 14.

The piston of Fig. 13 represents a reversal of the deep and shallow portions of the depression as disclosed in Fig. 9.

Figure 14:
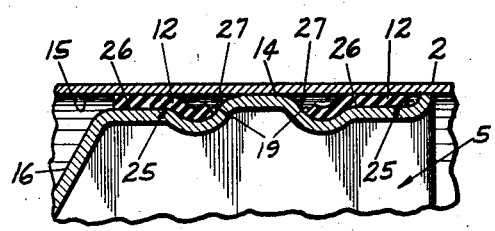
Figure 15:
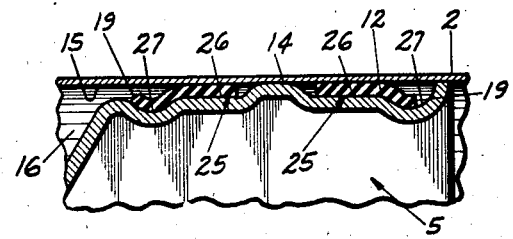

In Figs. 14 and 15 I have illustrated piston assemblies each incorporating a pair of the packing rings 12 so arranged that one will provide increased sealing function when the piston is urged in one direction and the other increased sealing function when the piston is urged in the opposite direction.

The piston of Fig. 14 comprises a combination of the packing arrangements of the pistons of Figs. 13 and 11 whereas the pistons of Fig. 15 comprise a combination of the packing arrangements of the pistons of Figs. 9 and 12.

While I have illustrated and described various forms of the piston and packing assembly for a container or cartridge and particularly described the pistons as constructed of sheet metal and the packing rings as comprising rubber rings, it should be understood that other materials may be employed for each of these elements without departing from the spirit or scope of the invention. By way of example, the pistons may be turned from wooden blocks or constructed of moulded composition and other pliant packing material, such as rawhide, might be substituted for the rubber bands described.

I claim:

1. A piston for lubricant cartridges, having a substantially cylindrical side wall traversed by a circumferential depression, a portion of the bottom of said depression being outwardly curved longitudinally, and a resilient packing ring located in said depression and extending substantially completely across the said outwardly curved portion thereby causing the said packing to assume a convex form.

2. A piston for lubricant cartridges, having a substantially cylindrical side wall traversed by a circumferential depression, a portion of the bottom of said depression being outwardly curved, and a packing-ring of resilient material in said depression and protected from contact with the contents of the package by a deposit of a plastic semi-solid material impervious to the said contents, having no harmful effect on the material of the packing ring and capable of lubricating the said packing ring to facilitate longitudinal movement of the piston.

3. A cartridge of the character described comprising a hollow cylindrical body, a piston slidably mounted in said body, said piston having a side wall extending substantially parallel with the adjacent inner side wall of said body and formed with a circumferential depression, a packing ring encompassing said piston side wall and lying in said depression, and a deposit of relatively plastic material in said depression interposed between said packing and the inner end of said piston thereby to protect said packing against contact with the contents of the cartridge.

4. A piston of the character described having a side wall extending substantially parallel to the longitudinal axis thereof, said side wall having an annular depression therein located in a plane transverse to said axis, the longitudinal central portion of said depression being outwardly curved, and a pliant packing ring located in said depression, the central portion of said packing ring being curved outwardly beyond the outer portion of said side wall by said outwardly curved portion of said depression and the edges of said packing ring lying on the sides of said outwardly curved portion radially inward of said central portion.

5. A piston of the character described having a side wall extending substantially parallel to the longitudinal axis thereof, said side wall having an annular depression therein located in a plane transverse to said axis, the longitudinal central portion of said depression being outwardly curved, and a rubber band having rectangular cross section located in said depression, the central portion of said rubber band being curved outwardly beyond the outer portion of said side wall by said outwardly curved portion of said depression.

6. A piston of the character described having a side wall lying substantially parallel to the longitudinal axis thereof, said side wall having an annular depression formed therein, of varying depth longitudinally, but of uniform section circumferentially, and a packing ring of pliant material having normally flat and relatively broad side walls disposed in said depression, the thickness of said packing ring being such as to cause those portions disposed in the portions of said depression of lesser depth to lie beyond the surface of said piston side wall.

7. A piston of the character described having a side wall lying substantially parallel to the longitudinal axis thereof, said side wall having an annular depression formed therein, the central portion of said depression being curved outwardly, and a packing ring of pliant material having normally flat and relatively broad side walls disposed in said depression, the thickness of said packing ring being such as to cause those portions disposed upon the outwardly curved portion of said depression to lie beyond the surface of said piston side wall.

8. A piston of the character described having a side wall lying substantially parallel to the longitudinal axis thereof, said side wall having a pair of spaced apart circumferential depressions formed therein each of varying depth, and a packing ring of pliant material having normally flat and relatively broad side walls disposed in each of said depressions, the thickness of said packing rings being such as to cause those portions disposed in the portions of lesser depth of said depressions to lie beyond the surface of said piston side wall, said depressions being so arranged with respect to each other that the packing ring in one is driven toward its said portion of lesser depth when the piston is moved in one direction and the packing ring in the other depression is driven toward its portion of lesser depth when the piston is moved in the opposite direction.

9. In a lubricant cartridge, a piston forming one end closure for said cartridge comprising a body having a side wall adapted to lie substantially parallel to the inner side wall of the cartridge, a rubber packing ring disposed upon said piston side wall and adapted for sealing engagement with said cartridge wall, and a deposit of a gel of soda-rosin and soda-hydrofol soaps in glycerine disposed between said packing ring and the inner end of said piston.

10. In a lubricant cartridge, a piston forming one end closure for said cartridge comprising a body having a side wall adapted to lie substantially parallel to the inner side wall of the cartridge and formed with a circumferential groove, a packing ring of material subject to deterioration in the presence of oil-soluble lubricant disposed in said groove and adapted for sealing engagement with said cartridge wall, and a deposit of a gel of soap in polyhydroxyl alcohol disposed in said groove between said packing ring and the head wall of said piston.

11. A piston for lubricant cartridges having a substantially cylindrical side wall traversed by a circumferential depression, a portion of the bottom of said depression being curved outwardly longitudinally, a resilient packing ring in said depression and extending over said outwardly curved portion, whereby said packing assumes a convex form, and means lying between the packing and the inner end of the piston to protect the packing.

HARRY R. TEAR.